UNITED STATES PATENT OFFICE.

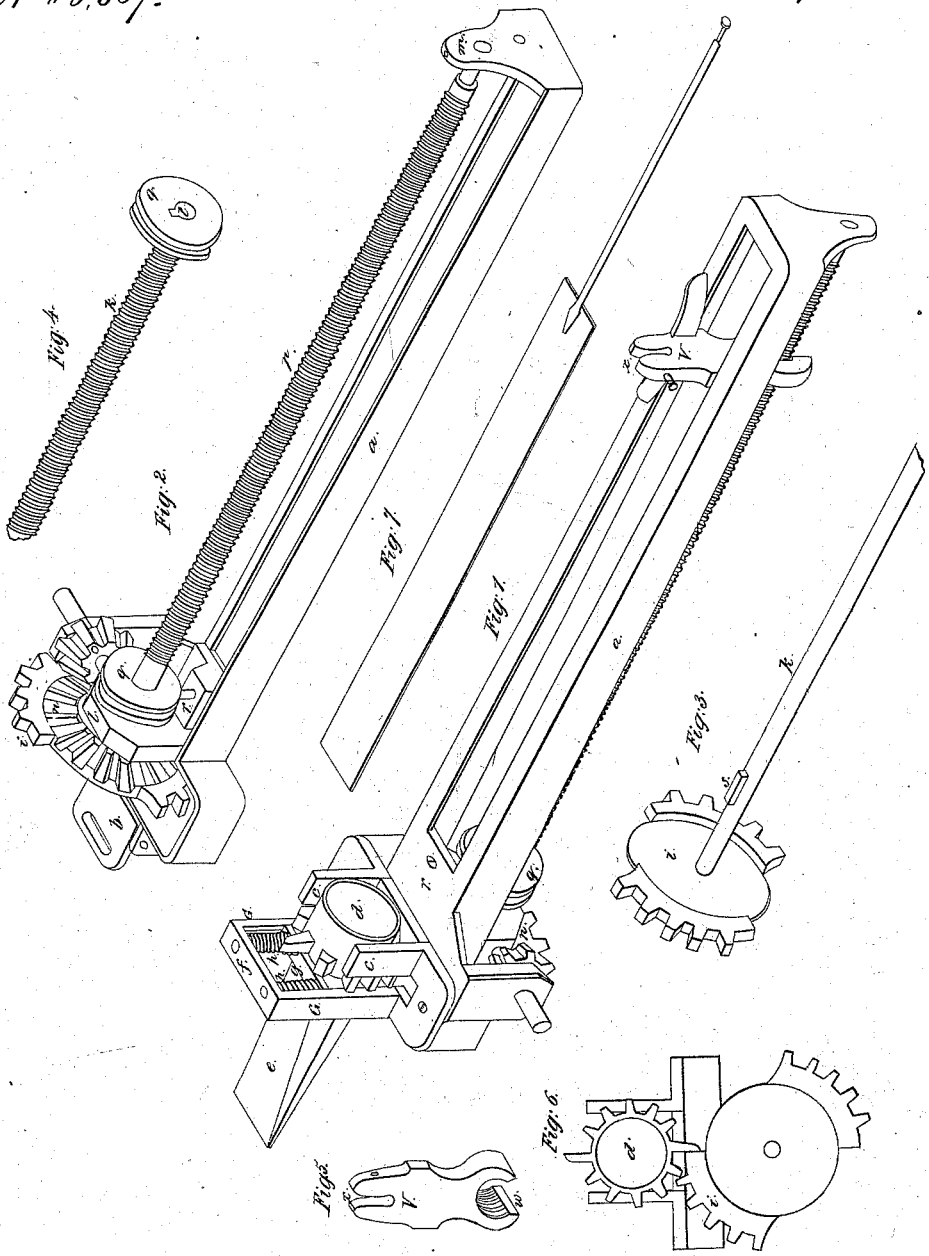

CALEB ISBISTER, OF ALLEGHENY CITY, PENNSYLVANIA.

NAIL-PLATE FEEDER.

Specification of Letters Patent No. 8,687, dated January 27, 1852.

*To all whom it may concern:*

Be it known that I, CALEB ISBISTER, of Allegheny City, Allegheny county, and State of Pennsylvania, have invented a new and useful Machine for Feeding Plate to the Nail Machine and which I call a "Rotary Feeder"; and I do hereby declare that the following is a correct, full, and exact description of the construction and operation of the same reference being had to the annexed drawings, making part of this specification, in which—

Figure 1 is a perspective view; Fig. 2, view of underside; Fig. 3, shaft and section wheel; Fig. 4, cam and tube; Fig. 5, movable head; Fig. 6, cylindrical wheel and section wheel; Fig. 7, feeding rod and plate.

My machine consists of an oblong square frame *a*, Figs. 1 and 2, having a strap *b* jointed at one end, by which to fasten it to the nail machine, the other end to be supported by any convenient contrivance. On the end of the frame attached to the nail machine (which I call the forward end) is made fast and projecting beyond it, two pairs of upright guides *c c c c*, one pair on each side, and one of each pair is grooved. Between them works a hollow cylinder *d* having on its outer circumference cogs as a cog wheel, two of which are longer than the others, one on each side these cogs work between the guides *c c c c* so as to hold the cylinder to its place. The guides allow the cylinder an upward and a downward motion, and also a rotary motion. To this cylinder is attached a guide or mouthpiece *e*, to convey the plate to the cutters. The upright guides having the grooves in them are connected together at the top by the tie plate *f*, and between them is a plate *g* having its ends fitted into the grooves, which plate rests upon the forward end of the cylinder. Between these two plates *g* and *f* I put one or two spiral springs *h h*, so as to keep the plate always pressed upon cylinder, and the cylinder resting on the end of the frame below the cylinder and working into the cogs around it is a sectional cog-wheel *i*, see Fig. 3 (being twice the diameter of the cylinder) which being divided into four parts, has cogs on two opposite parts; the other two parts being taken away from spaces between them. Each set of cogs being equal to half the diameter of the cylinder, will cause the cylinder to turn half around. It will then remain at rest while the blank space passes below it. These spaces are cut away sufficient to let the long cogs pass clear, till the next section of cogs is brought up, when the body of the wheel strikes them and puts the other cogs into gear, see Fig. 6. Any other division of the wheel may be made so as to allow a shorter or a longer rest, or three or more divisions of cogs might be made by altering the proportions of the wheels.

A shaft, *k*, Fig. 3, passes the whole length of the frame, supported on journals at the two ends, see Fig. 2, *l* and *m*. On this shaft and outside, the frame is the sectional cog wheel *i*, also a bevel wheel *n*, into which works the pinion, *o*. On this shaft and inside the frame is a tube *p* nearly the whole length, having a screw-thread on the outside and a cam *q* fast on the forward end in which is made a zigzag groove to receive a guide-pin *v*, made fast in the frame. Also on this shaft, see Fig. 3, is a small flanch *s*, and in the cam is cut a groove *t*, see Fig. 4, after the manner of a key seat to receive it so that the cam and tube can work forward and backward over it, as caused by the guide pin, while this flanch carries it around with the shaft. I then have a movable head *v*, Fig. 5, in the top end of which is a receiver *x*, for the feeding rod, and in the lower end of which is cut a nut *w*, through which the screwed tube works as it is carried around by the shaft. The screw-thread is taken off at each end of the tube to allow the movable head to slip over, the nut being cut away so as to straddle the barrel of the screw. This nut may be made with a movable jaw to open when pressed upon the screw, and close around it so as to give it more hold and allow it to be put on and taken off at any part.

By this arrangement the whole as a combined and direct forward motion, and I dispense with old contrivance to give a reversed motion to the plate which is not necessary to the effect.

The operation is as follows: Put the plate into the nippers of the feeding-rod; slip the end through the cylinder and into the mouth of the guide; place the end of the rod into the receiver of the moving head; then the pinion working into the bevel wheel, will bring the sectional into gear with the cogs around the cylinder, or the "cylindrical cog-wheel" and raising it up will turn it half around; it will then fall, and this is done at the same time that the moving head is carried backward and forward, by the motion of the tube upon the shaft guided by the cam working on the pin, and the plate will also be brought forward by the motion of the tube working into the nut of the moving-head.

What I claim as my invention and wish to secure by Letters Patent is—

1. The giving to the nail-plate an interrupted rotary motion in the same direction, instead of the reciprocating partially rotating motion in opposite directions, usually given to said plate, and this I claim irrespective of the mechanical devices by which said motion is communicated.

2. I claim the combination of the sectional cog-wheel, always moving in the same direction with the cylindrical cogwheel having irregular teeth working between guides, having a mouthpiece, and with the springs and spring plate or their equivalent, by means of which both an interrupted rotary and a raising and a falling motion is communicated to the nail plate.

3. I claim giving a continuous forward and an interrupted forward and backward motion to the nail-plate, by means of the revolving shaft, screwed-tube, cam, and guide-pin and nut $w$, combined with each other substantially as herein described.

CALEB ISBISTER.

Witnesses:
 JAMES EATON,
 CALEB ISBISTER, Jr.